United States Patent [19]

Schinkel et al.

[11] Patent Number: 5,126,198

[45] Date of Patent: Jun. 30, 1992

[54] HEAT-LAMINATABLE, GAS-BARRIER MULTI-LAYER FILMS

[75] Inventors: Ingo Schinkel, Walsrode; Ulrich Reiners, Neuenkirchen, both of Fed. Rep. of Germany

[73] Assignee: Wolff Walsrode Aktiengesellschaft, Walsrode, Fed. Rep. of Germany

[21] Appl. No.: 447,978

[22] Filed: Dec. 8, 1989

[30] Foreign Application Priority Data

Dec. 21, 1988 [DE] Fed. Rep. of Germany ....... 3842948

[51] Int. Cl.$^5$ .............................................. B32C 27/00
[52] U.S. Cl. .................................... 428/349; 428/516; 428/520
[58] Field of Search ...................... 428/349, 516, 520

[56] References Cited

U.S. PATENT DOCUMENTS

| 4,629,657 | 12/1986 | Gulati et al. | 428/511 |
| 4,762,748 | 8/1988 | Oberle | 428/349 |
| 4,777,095 | 10/1988 | Kondo et al. | |
| 4,830,918 | 5/1989 | Schinkel et al. | 428/424.4 |
| 4,842,930 | 6/1989 | Schinkel et al. | 428/349 |

FOREIGN PATENT DOCUMENTS 0229715 7/1987 European Pat. Off.

*Primary Examiner*—Edith L. Buffalow
*Attorney, Agent, or Firm*—Sprung Horn Kramer & Woods

[57] ABSTRACT

Improved heat-laminatable multi-layer film containing a polypropylene base layer, a heat-laminatable layer containing an ethylene/vinyl acetate copolymer and an ethylene/ethyl acrylate or ethylene/acrylic acid copolymer, one layer of the film being a gas barrier layer.

8 Claims, No Drawings

HEAT-LAMINATABLE, GAS-BARRIER MULTI-LAYER FILMS

The present invention relates to heat-laminatable, gas-tight multi-layer films.

Multi-layer films of polyolefins which have an orientated polypropylene base layer and are coated with various substances having adhesive heat-activatable adhesive resin properties, for example polyethylene, ethylene/vinyl acetate or ionomers, are disclosed in, for example, Japanese Preliminary Published Application 60-109834, 53-4082, U.S. Pat. No. 4,629,657 and EP-A-0 263 882. The known multi-layer films have various disadvantages, for example poor interlayer adhesion, a tendency of the laminated product to curl, unsatisfactory optical properties and problems during further processing, in particular by embossing.

Multi-layer films of polyolefins which have a biaxially oriented polypropylene base layer and have been subsequently coated with heat-laminatable substances, such as, for example, polyethylene, ethylene/vinyl acetate or ionomers, are known. Multi-layer gas-tight polypropylene films are likewise known. A combination of such films is thus unknown and does not appear feasible since there are to date no suitable formulations in combination with a suitable process technology, which provide an adequate gas barrier and have adhesion-promoting properties.

It was the object of the invention to provide a heat-laminatable film having a gas barrier layer. In particular, this film should be suitable for the production of laminated films without the addition of further adhesives.

The invention relates to a heat-laminatable multi-layer film which is at least monoaxially oriented and has a base layer I, which essentially consists of polypropylene, and at least one layer II which can be heat laminated by supplying heat and contains copolymerized ethylene units, characterised in that a) the layer II contains a mixture A of an ethylene/vinyl acetate copolymer A1) and at least one copolymer A2) selected from the group consisting of
A2.1) ethylene/ethyl acrylate copolymers and
A2.2) ethylene/acrylic acid copolymers and b) the film has a gas barrier layer.

In addition, the layer II may contain poly-1-butene.

In a preferred embodiment, the base layer I consists essentially or completely of a polypropylene. An isotactic polypropylene having a density of 0.9 to 0.91 g/cm$^3$ and a melt flow index of 1 to 4 g/10 min at 230° C./21.6N (according to DIN 53,735) is preferably used.

In a preferred embodiment, the mixture A for the heat-laminatable layer II contains:

50–95 parts by weight, preferably 65–95 parts by weight, of the ethylene/vinyl acetate copolymer A1), 10–50 parts by weight, in particular 10–35 parts by weight, of the ethylene/ethyl acrylate copolymer A2.1) and/or 5–35 parts by weight, preferably 8–20 parts by weight, of the ethylene/acrylic acid copolymer A2.2) and optionally 5–20 parts by weight of a polybutene A2.3), in particular poly-1-butene.

In a particularly preferred embodiment, the heat-laminatable layer II consists, apart from customary additives which may be present, of the stated copolymers A), A2.1), A2.2) and optionally A2.3), the stated parts by weight then being percentages by weight.

In a preferred embodiment, the ethylene/vinyl acetate copolymer A1) contains 70 to 95, in particular 75 to 95, % by weight of polymerized ethylene units, and, in a particularly preferred embodiment, the remaining amount consists essentially or completely of polymerized vinyl acetate.

In a preferred embodiment, the ethylene/ethyl acrylate copolymer A2.1) contains essentially polymerized ethylene units, in particular at least 88% by weight of polymerized ethylene units, in particular 88 to 92% by weight of polymerized polyethylene units, the remaining amounts consisting essentially or completely of polymerized ethyl acrylate.

In a preferred embodiment, the ethylene/acrylic acid copolymer A2.2) essentially consists of polymerized ethylene units, in particular at least 85% by weight of polymerized ethylene units, particularly preferably 85 to 95% by weight of polymerized ethylene units, the remaining amounts consisting essentially or completely of polymerized acrylic acid.

The polybutene A2.3) preferably consists essentially or completely of polymerized 1-butene.

The base layer I can contain 3 to 15% by weight, preferably 8 to 12% by weight, of additives which are incompatible with the polypropylene, preferably inorganic additives, such as calcium carbonate, silica, sodium aluminium silicate and/or titanium dioxide, with the result that the film can be rendered opaque. However, it is also possible for the base layer to contain a finely divided organic, incompatible additive, preferably particles of polystyrene, polymethylmethacrylate, polytetrafluoroethylene and/or copolymers of these compounds. Incompatibility means that these polymers form a separate phase. They may have a melting point and in particular a modulus of elasticity which differs from those of the polypropylene. Hence, during the orientation process for the multi-layer film, tearing of the polymer matrix and therefore vacuole formation occur when such additives are present.

The ethylene/vinyl acetate copolymer A1) preferably has a melt flow index of 0.1 to 15 g/10 min at 230° C. and 21.6N (DIN 53,735), particularly preferably 0.3 to 8 g/10 min at 230° C. and 21.6N.

The copolymers A2.1) and A2.2) preferably have a melt flow index of 0.5 to 5 g/10 min at 230° C. and 21.6N.

Copolymer A2.3) preferably has a melt flow index of 0.2 to 8 g/10 min at 230° C. and 21.6N.

In a preferred embodiment, the heat-laminatable layer II is simultaneously a gas barrier layer. In another preferred embodiment, an additional layer III, which acts as a gas barrier layer, is present.

Polyacrylonitrile, polyvinylidene chloride and in particular hydrolysed ethylene/vinyl acetate copolymers which have preferably 50 to 20, in particular 40 to 25, % by weight, relative to the copolymer, of ethylene units, the degree of hydrolysis of the vinyl acetate units being preferably at least 90%, in particular more than 95%, are preferably contained as effective gas barrier layer material B) in the gas barrier layer. The limiting viscosity of the gas barrier layer material B), measured in a solvent mixture of 85% by weight of phenol and 15% by weight of water, is preferably between 0.07 and 0.17 g$^{-1}$, particularly preferably between 0.09 and 0.15 g$^{-1}$.

In a further preferred embodiment, adhesion promoters C) are additionally used in a layer of the film according to the invention. The adhesion promoter may be present in a separate adhesion promoter layer IV or in another layer. Modified polyolefins are preferably used as adhesion promoters C). These are, in particular polyolefins having carboxyl groups, such as, for example, polypropylene or polyethylene which have been grafted with at least one monomer from the group consisting of the α,β-monounsaturated dicarboxylic acids, such as, for example, maleic acid, fumaric acid or itaconic acid, or their anhydrides, esters, amides and imides, or are copolymers of ethylene with α,β-monounsaturated carboxylic acids, such as acrylic acid, methacrylic acid and/or their metal salts (Zn, Na) and/or their $C_1$-$C_4$-alkyl esters, or corresponding graft polymers on polyolefins such as polyethylene or polypropylene or hydrolysed copolymers which have already been described and which have been graft polymerized with a monomer or the above-mentioned unsaturated acids.

Polyolefins, such as propylene or copolymers of propylene and ethylene, having not more than 1.0% by weight of grafted, α,β-monounsaturated dicarboxylic anhydride, such as maleic anhydride, or their hydrolysed copolymers are particularly preferred.

In a further preferred embodiment, the film according to the invention contains a sealing layer V.

The sealing layer preferably contains an ethylene homopolymer or copolymer, a high-density polyethylene or a random ethylene/propylene copolymer containing at least 3% by weight of ethylene, preferably 94 to 96, particularly preferably 95, % by weight of propylene and 4 to 6, particularly preferably 5, % by weight of ethylene being preferably used.

The polymer for the sealing layer should preferably have a density from the range of 0.895 to 0.960 $g/cm^3$ and a melt flow index of 1 to 7 g/10 min at 230° C./2.16N/$cm^2$ pressure and a crystallite melting point in the range from 125° to 148° C., depending on the type (under the polymerisation microscope).

The film consists of at least two layers, a heat activatable adhesive resin layer, which has a gas barrier action, and a polypropylene base layer. However, depending on the desired degree of the gas barrier property, it can also consist of more layers, for example a heat activatable adhesive resin layer, a gas barrier layer, an adhesion-promoting layer and the polypropylene base layer.

Preferred layer structures are described below:

TWO-LAYER STRUCTURE

I. Base layer, preferably 100% by weight of polypropylene.

II. Heat-laminatable layer having a gas barrier action.

The layer II preferably contains the above-mentioned polymers A), B) and C), in particular 50 to 100 parts by weight of B) and 0 to 50 parts by weight of C) being present per 100 parts by weight of A).

THREE-LAYER STRUCTURE

The structure consists of the following layer sequence: I, III, II.
I. Polypropylene base layer The polypropylene base layer either consists of polypropylene or contains a mixture of polypropylene and the above-mentioned polymers A) and C), 0 to 5 parts by weight of A) and 0 to 5 parts by weight of C) preferably being present per 100 parts by weight of propylene.

III. Gas barrier layer

In a preferred embodiment, the gas barrier layer consists of a mixture of the above-mentioned polymers A), B) and C), in particular 0 to 40 parts by weight of A) and 0 to 30 parts by weight of C) being present per 100 parts by weight of B).

II. Heat-activatable adhesive layer

In a preferred embodiment, the heat-activatable adhesive layer consists of a mixture of polymers A), B) and C), in particular 0 to 30 parts by weight of B) and 0 to 20 parts by weight of C) being present per 100 parts by weight of A).

FOUR-LAYER STRUCTURE

The four-layer structure consists of the following layer sequence: I, IV, III, II.
I. Base layer The base layer either consists of pure polypropylene or contains 0 to 5 parts by weight of the adhesion promoter C) per 100 parts by weight of polypropylene.

IV. Adhesion promoter layer

In a preferred embodiment, the adhesion promoter layer consists of the adhesion promoter C) or of a mixture with the above-mentioned polymers B), 0 to 5 parts by weight of B) preferably being present per 100 parts by weight of an adhesion promoter C).

III. Gas barrier layer

The gas barrier layer preferably consists either exclusively of the gas barrier layer material B) or of a mixture of B) with the adhesion promoter C). 0 to 5 parts by weight of C) preferably being present per 100 parts by weight of B).

II. Heat-activatable adhesive resin

The heat-activatable adhesive resin layer contains a mixture of polymers A) and B), 0 to 10 parts by weight of B) preferably being present per 100 parts by weight of A).

The layers of the multi-layer films according to the invention may be provided with customary additives and auxiliaries, such as, for example, lubricants, antiblocking agents and antistatic agents in customary amounts.

The multi-layer films according to the invention can be produced by customary methods, such as lamination, coating or melt (co)extrusion, and the material for the hotmelt adhesive layer can preferably be prepared by direct compounding.

The multi-layer film may contain the customary additives and auxiliaries, such as, for example, lubricants, antiblocking agents and antistatic agents, in customary amounts in the individual layers; cf. for example EP-A-0 027 586 and EP-A-0 263 882 and the literature cited in each case.

The multi-layer films according to the invention can be produced by customary methods, such as lamination, coating, extrusion coating, melt extrusion or melt coextrusion. In a particularly preferred embodiment, the multi-layer films are not oriented only once but are biaxially oriented. In a preferred embodiment, the base layer I is extruded and oriented in one direction, the heat-laminatable layer II being applied by lamination or extrusion after the orientation process. Thereafter, the multi-layer film thus obtained is oriented again, preferably in the direction in which no orientation has as yet been effected.

The individual constituents of the heat-laminatable layer II are preferably combined in one process stage, melted and applied to the base film I.

The multi-layer films according to the invention are at least monoaxially, preferably biaxially, oriented, the longitudinal orientation preferably being carried out in a ratio of 5:1 to 7:1 and the transverse orientation in a ratio of 7:1 to 10:1.

In the multi-layer films according to the invention, the polypropylene base film preferably has a thickness of 10 to 50 μm and the heat-laminatable layer preferably has a thickness of 4 to 20 μm, particularly preferably 5 to 10 μm.

The multi-layer films according to the invention are particularly suitable as high-gloss laminating films for the production of gas-barrier paper and cardboard laminates for book covers and brochure covers, and for cardboard boxes which can also be embossed and fluted.

The multi-layer films according to the invention are particularly suitable as laminated film components in laminated films for the packaging of easily perishable foods.

The invention furthermore relates to a process for the production of a multi-layer film according to the invention, characterised in that a base layer I is provided with at least one layer II which can be activated by supplying heat.

The invention furthermore relates to a process for the production of laminates from any substrates and a film according to the invention, characterised in that the substrate and the film are combined under the action of heat and, preferably, only slight pressure, the layer II of the film according to the invention facing the substrate. The substrates are preferably materials which are usually used for the production of high-gloss laminated products, such as, for example, paper, board, cardboard and especially foils, in particular plastic or metal foils.

To determine the interlayer adhesion, the films are passed, together with a black cardboard of 300 g/m², between two rotating rollers, the side facing the film being heated to about 100° C. and the rollers being pressed together under a pressure of 130N/cm at a speed of 3 m/min. The film and the cardboard are then separated and the interlayer adhesion is measured using a tensile test machine. The interlayer adhesion is based on a 15 mm wide strip.

The measurement of the $O_2$ permeability is carried out according to DIN 53,380.

EXAMPLE

A heat-laminatable layer II containing the constituents stated in the Table below is applied to a monoaxially oriented base film of polypropylene having a density of 0.905 g/cm³ and a melt flow index of 3.3 g/10 min at 230° C./21.6N and then oriented so that a laminated film having a longitudinal orientation in a ratio of 5:1 and a transverse orientation in a ratio of 10:1 is obtained. The base film has a thickness of 15 μm and the heat-laminatable layer has a thickness of 7 μm.

The heat-laminatable layer II has the following composition:
- 44% of A1: Ethylene/vinyl acetate copolymer containing 18% of vinyl acetate monomer
- 11% of A2.2: Ethylene/acrylic acid copolymer containing 7% of acrylic acid monomer
- 37% of B: Ethylene/vinyl acetate copolymer containing 55% of vinyl acetate units which have a degree of hydrolysis of 96%
- 8% of C: Modified polypropylene containing a hydrolysed copolymer with 0.7% by weight of grafted maleic anhydride Layer thickness: Base layer polypropylene I: 20 μm
Heat-activatable adhesive resin layer II: 10 μm
Interlayer adhesion: 1.1N/15 mm
$O_2$ transmission: 49 cm³/(m².d.bar)

The film can be laminated with other customary films without difficulties in a simple manner with the supply of heat and under pressure.

We claim:

1. Heat-laminatable, at least monoaxially oriented multi-layer film having a base layer I, consisting essentially of polypropylene, and at least one layer II which can be heat-laminated by supplying heat and which contains copolymerized ethylene units, wherein
   the said layer II contains a mixture A of an ethylene/vinyl acetate copolymer a1) and at least one copolymer A2) selected from the group consisting of
   A2.1) ethylene/ethyl acrylate copolymers and
   A2.2) ethylene/acrylic acid copolymers and the film has a gas barrier layer.

2. Film according to claim 1, wherein the heat-laminatable layer II is the gas barrier layer.

3. Film according to claim 1, wherein an additional layer III is present as the gas barrier layer.

4. Film according to claim 1, wherein the layer acting as the gas barrier layer contains a hydrolysed ethylene/vinyl acetate having a degree of hydrolysis of at least 90%.

5. Multi-layer film according to claim 1, wherein the layer II contains 50 to 95 parts by weight of copolymer A1), 10 to 50 parts by weight of copolymer A2.1) and 5 to 35 parts by weight of copolymer A2.2), relative to the sum of the copolymers A1), A2.1) and A2.2).

6. Film according to claim 1, wherein in that copolymer A1) consists of at least 70% by weight of copolymerized ethylene units, copolymer A2.1) consists of at least 88% by weight of copolymerized ethylene units and copolymer A2.2) consists of at least 85% by weight of copolymerized ethylene units.

7. Films according to claim 1, wherein in that a polybutene A2.3) is additionally contained in the layer II.

8. Multi-layer film according to claim 1 wherein the layer II contains 50 to 95 parts by weight of copolymer A1), 5 to 35 parts by weight of copolymer A2.2), relative to the sum of the copolymers A1) and A2.2).

* * * * *

UNITED STATES PATENT AND TRADEMARK OFFICE
CERTIFICATE OF CORRECTION

PATENT NO. : 5,126,198

DATED : June 30, 1992

INVENTOR(S) : Schinkel et al.

It is certified that error appears in the above-identified patent and that said Letters Patent is hereby corrected as shown below:

Col. 6, line 27    Delete " al " and substitute -- Al --

Col. 6, line 45    Delete " in that "

Col. 6, line 51    Delete " in that "

Signed and Sealed this

Fifteenth Day of February, 1994

Attest:

BRUCE LEHMAN

*Attesting Officer*            *Commissioner of Patents and Trademarks*